Oct. 27, 1942.   H. F. STORM   2,299,957
VIBRATORY ELECTROMAGNETIC MOTOR
Filed Jan. 17, 1941
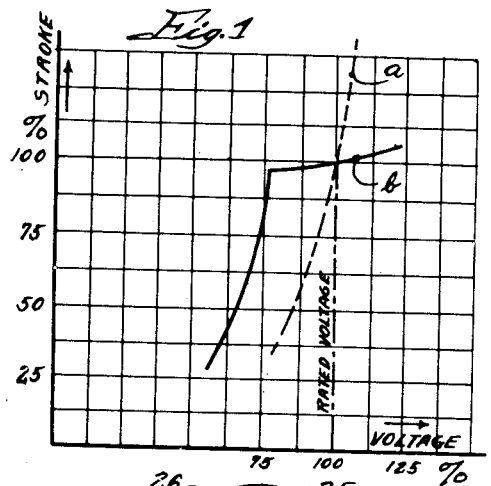
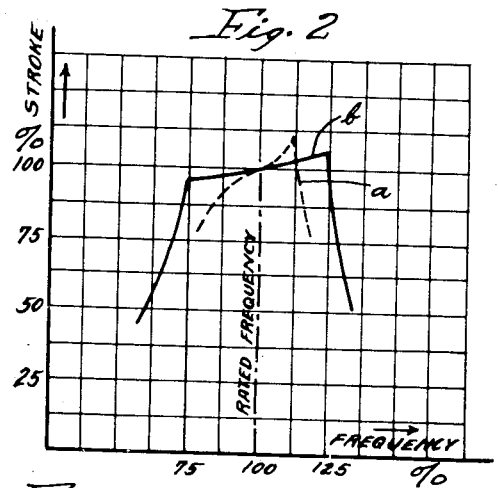
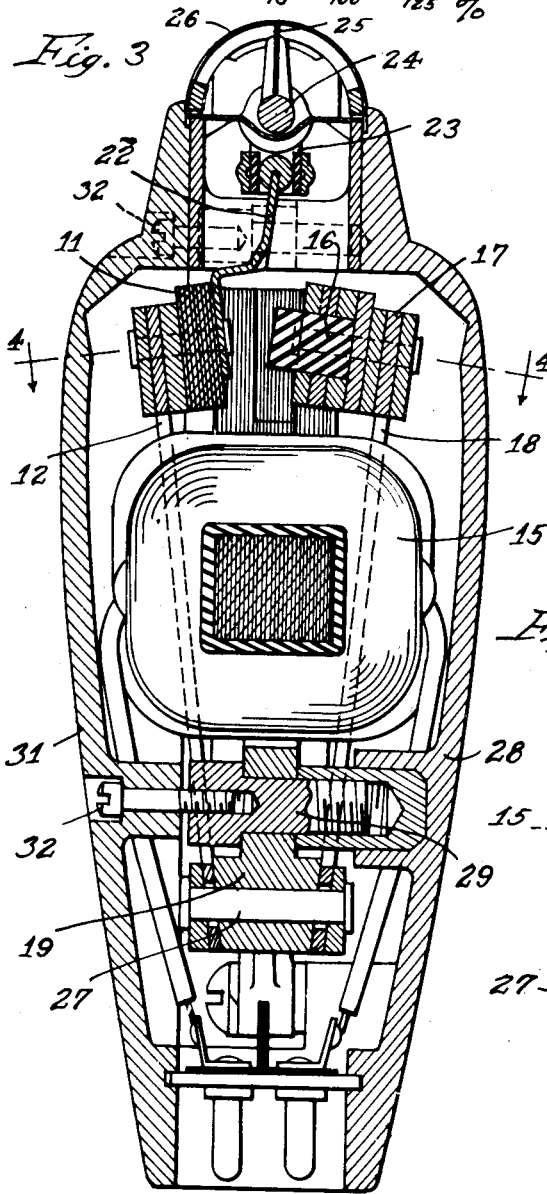
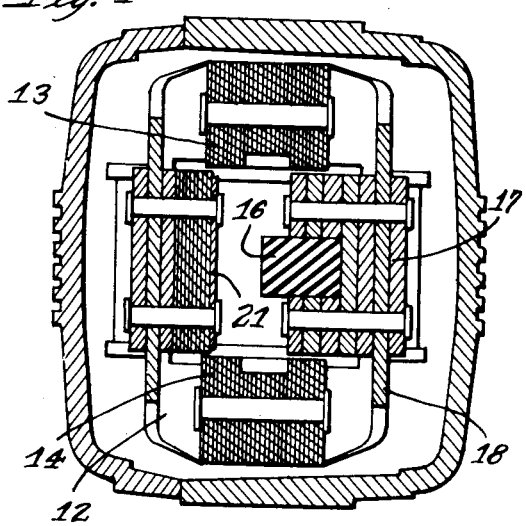
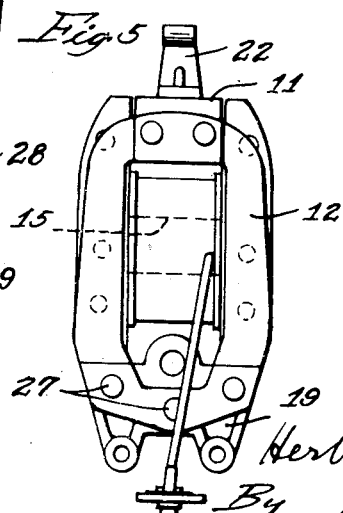
Inventor:
Herbert F. Storm
By McCanna, Wintercorn, & Morsbach
Attys.

Patented Oct. 27, 1942

2,299,957

UNITED STATES PATENT OFFICE 2,299,957

VIBRATORY ELECTROMAGNETIC MOTOR

Herbert F. Storm, Chicago, Ill., assignor to Chicago Flexible Shaft Company, Chicago, Ill., a corporation of Illinois Application January 17, 1941, Serial No. 374,802

2 Claims. (Cl. 172—126)

This invention relates to vibratory electromagnetic motors and has more particular reference to motors of this type adapted for use in small hand tools or implements such, for example, as dry shavers, hair clippers, and the like.

In motors of this type the stroke of the vibrator depends largely on the frequency and voltage of the energizing source; consequently, even a slight increase or decrease in frequency or voltage causes variations in the stroke. These deviations in the magnitude of the stroke are undesirable mainly for the reason that a decrease in stroke reduces the efficiency of the device and an increase in stroke causes excessive movement which may result in a moving part striking against a stationary part and causing damage to the vibrator or at least causing noise. While modern power stations keep the frequency quite constant and the line voltage is subject to only small variations, nevertheless, the manufacturer of electromagnetic devices is confronted with the fact that in different parts of the country and in different countries a multitude of line voltages are actually in use. The manufacturer is forced, therefore, in order to meet these conditions, to develop many types of the same device in order to take care of the various voltage requirements.

One of the objects of the present invention is to provide for immunization against sensitivity of voltage and frequency changes in vibratory electromagnetic motors whereby to improve the manufacture of motors of the character described.

Another object is to provide novel means for imposing an elastic force on the stroke of a vibratory electromagnetic motor with the view to improving the operating efficiency and to minimizing noise.

Another object is to attain these ends by the provision of a simple and inexpensive structure.

Other objects and attendant advantages will be appreciated by those skilled in this art as the invention becomes better understood by reference to the following description when considered in connection with the accompanying drawing, in which—

Figures 1 and 2 are charts illustrating the performance example of my invention, explained hereinafter;

Fig. 3 is a longitudinal section through a vibratory electromagnetic motor embodying my invention as applied to a dry shaver, the motor and shaver being of a particular design noted hereinafter, this drawing showing the parts on an enlarged scale, almost twice actual size;

Fig. 4 is a cross section taken substantially on the section line 4—4 of Fig. 3, and Fig. 5 is a side view of the motor proper, removed from the housing, as viewed from the left hand side of Fig. 3.

In this application I have shown my invention in a preferred embodiment as applied to a vibratory electromagnetic motor having the invention disclosed in the application of Ivar Jepson, Serial No. 324,599, filed March 18, 1940. The present invention is an improvement on an electromagnetic motor of the Jepson type which is adapted for operation by alternating current. My invention is, however, capable of broader application in vibratory electromagnetic motors energized either by alternating current or direct current, in the latter case where contacts are used as is well understood in this art.

As a means of illustrating the principle involved in my invention reference is made to the charts, Figs. 1 and 2. In Fig. 1 the horizontal spaces represent voltage changes and in Fig. 2 they represent frequency changes. In both charts the vertical spaces represent stroke lengths. The space units represent percentages with relation to a given voltage, frequency, or stroke length designated by 100. In Fig. 1 the curve $a$ shows how rapidly the stroke of a vibrator without my invention increases or decreases with only very slight changes in the supply voltage. In Fig. 2 the curve $a$ shows the irregular stroke action caused by change in frequency, it being particularly noticeable that there is an abrupt reduction in stroke for increase in frequency at a certain point in the frequency. My invention has its conception in the provision of means for immunization against sensitivity of voltage and frequency changes within a particular range of operation with the ultimate view to obtaining substantial uniformity of stroke within wider voltage and frequency changes than was possible with prior structures. With the use of my invention, as will be presently described, changes in voltage noted on the chart, Fig. 1, have a minimum effect on the stroke throughout a comparatively wide operating range as for example, from approximately 75% to 125% of the rated voltage, as noted by the curve $b$. Likewise, with my invention frequency changes in this range have a minimum effect on the stroke, as shown by the curve $b$ in Fig. 2.

In order to overcome the objectionable features above described I have in this invention applied elastic forces to the armature which have a non-linear stroke-elastic force characteristic. For example, in the vibratory motor shown in Fig. 3 is shown a vibratory armature 11 carried on a leaf spring 12, the armature being attracted by the magnetic impulse from the pole pieces 13 and 14 in response to energization of the coil 15. In the medium position of the armature the spring is not deflected and no magnetic force acts on the mass of the armature. When the coil is energized the armature approaches the field or pole pieces and the spring is gradually deflected. As a result of this deflection a gradually increasing pull is originated by the spring upon the mass of the armature. This pull and the stroke are in a straight line proportion, which fact may be termed a linear stroke-elastic force characteristic. Under this condition we have the stroke curves a in Figs. 1 and 2 in response to voltage and frequency changes. My invention provides additional forces acting on the armature mass and applied by elastic means to produce what may be termed a non-linear stroke-elastic force characteristic. The additional forces may be applied in various ways to the armature, as by one or more spring elements, or one or more rubber bumper elements. In the form of my invention here shown a rubber bumper element 16 is fixed to a vibratory member 17 which is carried by a leaf spring 18. The spring 18 may be generally similar in shape to the spring 12. The vibratory member 17 is preferably, but not necessarily, an idler member, that is, its mass does not contain iron or material which is responsive to any appreciable degree to the magnetic force. Under this arrangement the spring member 17—18 is vibrated in response to vibration of the armature member 11—12 by reason of the reaction of vibration forces through the common base 19 upon which the springs 12 and 18 are mounted. In the preferred embodiment the rubber bumper 16 is arranged to impinge against the opposite face 21 of the armature for a fractional period in the impulse or attraction stroke of the armature. This impingement exerts elastic forces against the vibratory armature, that is, the member which moves the work-piece, in this instance the arm 22 which transmits motion to the cutter or cutter-carrying part of the shaver. As a result of this impingement of the elastic means against the armature, the pull at the mass of the armature above referred to is the sum of two components. The first component is the elastic force of the leaf spring. The second component is due to the forces originated by the impingement of the rubber bumper. The curve of the sum of these components over its total length is a departure from a straight line; and this I term a non-linear stroke-elastic force. The effect of this combination of elastic means is to reduce to a minimum variation in the stroke through a substantial range of changes in voltage or frequency, or both. This effect is shown graphically in the curves b of Figs. 1 and 2.

As a result of my invention the operating stroke of a vibratory motor is more effectively controlled, regardless of ordinary voltage and frequency changes, thereby improving the performance and reducing noise. This is particularly desirable in the application of a vibratory motor to devices such as dry shavers and hair clippers. In this type of device it is desired to obtain a uniform operating stroke without objectionable noise. In the case shown in the drawing the length of the stroke is an important factor because the cutter must be operated over a wide arc, thereby requiring an unusually long stroke for a small motor. As shown, the arm 22 has a drive transmitting connection to a cutter carrier 23 mounted to oscillate about a center 24 and carrying a cutter blade 25 which is moved back and forth in coaction with a perforated comb 26 in keeping with the patent to John Bruecker, No. 2,081,694, granted May 25, 1937, for Electric shaver. As described more fully in the above mentioned Jepson application, the coil 15 is carried on a laminated core or field structure which is shaped to provide the opposed pole pieces 13 and 14 above mentioned. The springs 12 and 18 above mentioned are rigidly clamped at 27 to the lower end of this field structure. The field structure in turn is rigidly clamped at its lower end to the housing part 28 by means of a bolt 29. The opposite housing part 31 is clamped to the first mentioned housing part by screw bolts 32. In a device of this kind designed to be held in the hand for use as a shaver or clipper, it is highly desirable to have a small housing adapted for convenient manipulation. This necessarily calls for comparatively close limits between the housing and the moving parts. Voltage and frequency variations are, therefore, a factor affecting the cooperative relation between these parts. It will be manifest, therefore, that my invention provides a simple and practical means for promoting greater uniformity in the operating stroke, regardless of variations in voltage and frequency over a considerable range, and that with these operating characteristics the efficiency of a device of this kind is generally improved.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. In a vibratory electromagnetic motor, a coil adapted to be energized by electric current, an armature member vibrated in response to energization of said coil and having a motion-transmitting connection with a work-piece for operating the same, a second vibratory member free to vibrate in reaction relation to the work-piece armature, and an elastic element carried by one of said members and arranged to impinge against the other member during only a fraction of the stroke, said second vibratory member having no motion-transmitting connection with said work-piece except at the impingement interval.

2. A vibratory electromagnetic motor as set forth in claim 1, in which the elastic element is a material which combines elastic and vibration dampening properties.

HERBERT F. STORM.